United States Patent [19]
Niedzielski

[11] 3,751,231
[45] Aug. 7, 1973

[54] APPARATUS FOR USE IN TREATING FLUIDS

[76] Inventor: Albert Niedzielski, 802 Michigan Blvd., Erie, Pa. 16505

[22] Filed: Jan. 21, 1971

[21] Appl. No.: 108,387

[52] U.S. Cl................... 23/260, 23/252 R, 210/24, 210/37, 210/38, 55/74, 55/524, 55/516, 55/419, 55/511, 55/482, 55/185, 55/323, 55/387, 55/389, 55/350

[51] Int. Cl................................................. B01j 1/08

[58] Field of Search.................. 23/284, 252, 288 R; 210/24, 37, 38; 55/74, 524, 516, 419, 511, 482, 185, 323, 387, 389, 350

[56] References Cited
UNITED STATES PATENTS

| | | | |
|---|---|---|---|
| 3,479,146 | 11/1969 | Hochman et al. | 23/288 R |
| 2,087,688 | 7/1937 | Johnson | 55/516 X |
| 3,363,843 | 1/1968 | Ballard et al. | 239/504 |
| 1,749,373 | 3/1930 | Breuer | 55/511 |
| 3,424,548 | 1/1969 | Gunther | 55/74 X |
| 3,505,794 | 4/1970 | Nutter et al. | 55/524 X |
| 2,513,556 | 7/1950 | Furczyk | 55/350 X |

*Primary Examiner*—James H. Tayman, Jr.
*Attorney*—Arland T. Stein, Robert D. Yeager et al.

[57] ABSTRACT

Apparatus for supporting a bed of granular material through which fluid under pressure is continuously passed including an upright elongated vessel, means for diffusing incoming fluid to the vessel, a screen assembly for supporting the bed of granular material and a collecting chamber formed in the bottom of the vessel beneath the screen assembly.

1 Claim, 3 Drawing Figures

PATENTED AUG 7 1973
3,751,231
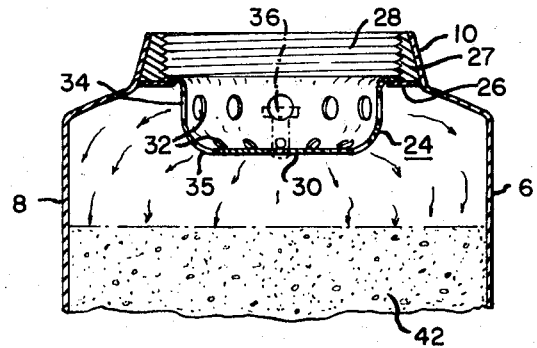
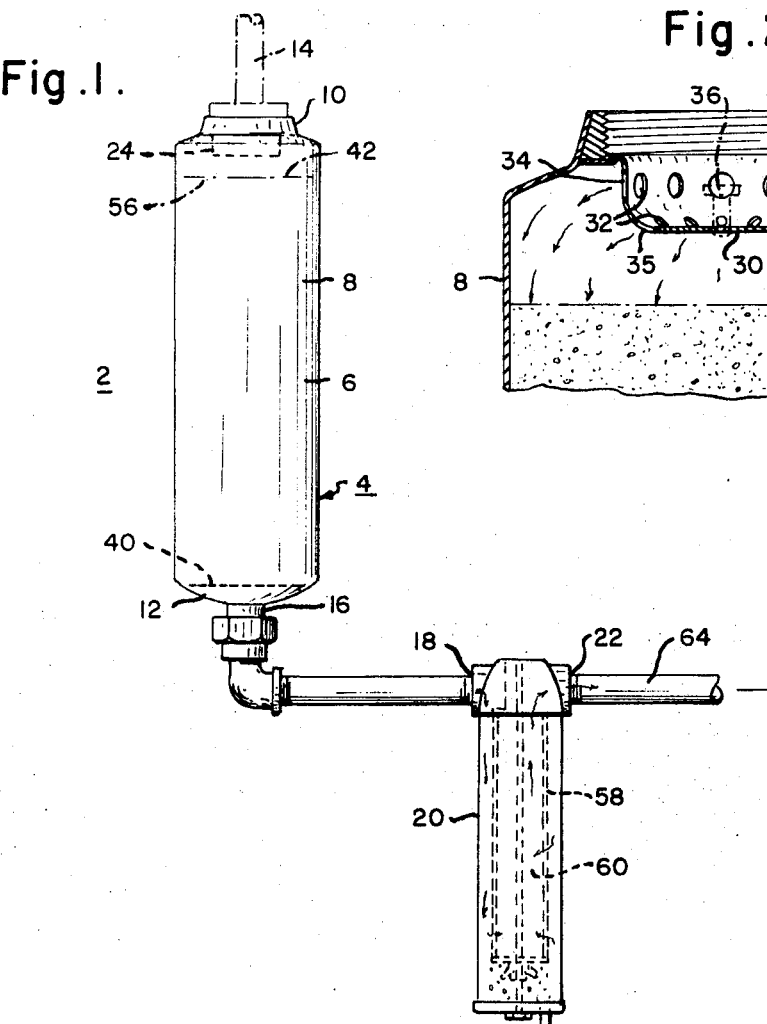
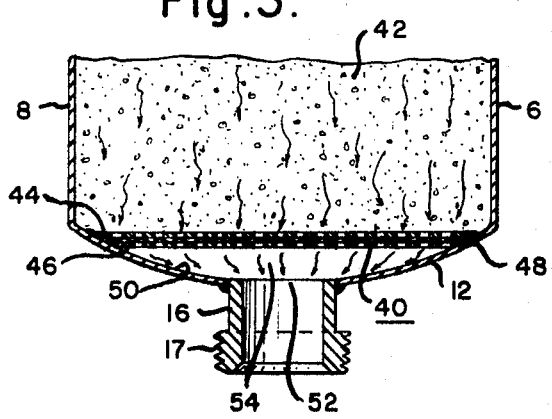
INVENTOR
Albert Niedzielski
his attorneys

APPARATUS FOR USE IN TREATING FLUIDS

This invention relates to apparatus for supporting a bed of granular material through which fluid under pressure is passed; more particularly, to a vessel adapted to create uniform flow of a gas through a bed of granular material supported within the vessel.

There are instances where it is desired to pass fluids under pressure through a bed of granular material for the purpose of either effecting a chemical reaction between the bed material and the constituents of the fluid or to physically remove discrete materials carried in the fluid. The apparatus used for this type of treatment may often comprise an upright tower having a column or bed of granular material contained therein. Whether the objective of passing the fluid through the bed of granular material is to effect a chemical reaction or to physically alter the composition of the fluid, it is desirable to create uniform flow of the fluid through the bed in order to take advantage of the maximum amount of available surface area of the granular material. One of the problems associated with this type of treatment apparatus is that the particles of granular material sometimes coalesce or "clog," thereby impeding the free passage of fluid. Another problem which frequently arises is the occurrence of what is called "channeling." Channeling is when the fluid seeks the same restricted path through the bed and results in non-utilization of a major portion of the surface area of the granular material in the bed. Channeling often occurs when the fluid inlet has a cross-sectional area substantially less than the cross-sectional area of the vessel tower through which the fluid is flowing, and may be aggravated when the outlet opening is similarly of a reduced cross-sectional area. This latter situation often results in the fluid passing only through a central core of the bed and not flowing through the granular material radially spaced from the core.

An illustration of a system in which treatment apparatus of the type described above may be used is in the removal of amines from steam. In steam distribution systems, the presence of oxygen or carbon dioxide has a severely corrosive effect on the walls of the steam lines. Oxygen generally attacks the walls by pitting while an attack by carbon dioxide will usually result in an acutal thinning of the metal wall of the pipe. It has been found that these adverse effects of oxygen and carbon dioxide may be neutralized by adding amines to the steam system. Neutralizing amines volatilize with the steam and combine with carbon dioxide to neutralize its acidity. Filming amines lay a non-wettable film of mono-molecular thickness over the metal surface and the film prevents the water from reaching the metal surface, thereby preventing attack.

While the addition of amines to steam distribution systems appears to have overcome the problem of corrosion in the system, it has created a new problem for steam users. Amine-contaminated steam is unsuitable for certain applications; for instance in the sterilization or processing of pharmaceuticals and in food processing. The concentration of amines (e.g., octadecylamine, morpholine and cyclohexylamine) in steam used in the foregoing applications is carefully controlled at the present time by federal regulation. Thus, it becomes advantageous for a consumer of steam to be able to eliminate or reduce the presence of amines at the point of use.

A system for removal of amines from steam was proposed in a paper entitled "Boiler Amine Removal For Pharmaceutical Applications of Steam" presented by Don A. Gunther at a meeting of representatives of the drug industry in Philadelphia, Pa. in June, 1967. That system involves the passage of steam through a column of acid cation exchange resin to strip the steam of amines. The steam emerges from the resin free of amines but with acid condensate entrained in it. The entrained mist is removed by passing the steam through a phase separator which permits passage of the vapor phase steam but restricts the passage of the liquid phase concentrate. Droplets of the liquid contaminants coalesce on the surface of a filter and are separately discharged. The steam thus emerges from the phase separator in a purified state.

Heretofore, little effort has been devoted to the development of suitable apparatus for supporting the bed of resin in an amine removal system. It has been proposed to employ an upright cylinder having a flat bottom with a fine-mesh, flexible screen spaced away from the bottom for supporting the resin. Uniform flow of steam through the resin bed was sought by providing a diverging inlet section at the top of the cylinder. The cylinder did not operate satisfactorily for a number of reasons: (i) The weight of the resin column forced the flexible screen into contact with the flat bottom, thereby rendering the effective area for discharge to be the area of the outlet; as a consequence, severe channeling and even complete blockages occurred; (ii) despite the diverging inlet, the direct impingement of steam upon the resin bed gouged a hole in the central portion of the bed with resultant decrease in the residence time of the steam within the bed; and (iii) little or no steam flow was created downwardly through the outer portions of the bed thereby resulting in failure to utilize a major portion of the available surface area of resin present for ion exchange.

I have discovered apparatus which overcomes the shortcomings of prior designs in a manner to provide uniform steam flow through the resin bed while minimizing the occurrence of channeling and the effects of clogging.

I provide apparatus for supporting a bed of granular material through which fluid under pressure is continuously passed comprising: an upright elongated vessel having a fluid inlet at the top and a fluid outlet at the bottom; means disposed within the vessel adjacent the fluid inlet for diffusing the incoming fluid; a first screen disposed within the vessel at the bottom portion thereof and transversely of the fluid flow for supporting the bed; a second screen disposed within the vessel beneath the first screen and transversely of the fluid flow; and a collecting chamber formed in the bottom portion of the vessel beneath the second screen by the walls of the vessel converging toward the fluid outlet.

Preferably, I provide that the diffusing means comprises a generally cup-shaped member having a flat bottom and having a plurality of openings radially spaced from the geometric center. In addition, I prefer that the flat bottom portion be centrally aligned with the axis of the fluid inlet and have an area at least equal to the cross-sectional area of the fluid inlet.

I further provide that the second screen be of sufficient rigidity to prevent the first screen from forcing the second screen into contact with the walls of the collecting chamber.

I have found that the present invention has particular usefulness in a system for removing amines from steam in which case the granular material comprises an ion exchange resin of the type described hereinafter. However, the invention is believed to be equally useful in a variety of systems involving the passage of fluid under pressure through a bed of granular material.

Other details, objects and advantages of the invention will become apparent as the following description of a present preferred embodiment thereof proceeds.

In the accompanying drawings, I have shown a present preferred embodiment of the invention in which:

FIG. 1 is an elevational view of a complete amine removal system embodying the apparatus of the present invention;

FIG. 2 is an enlarged sectional view of the top portion of the elongated vessel shown in FIG. 1; and FIG. 3 is an enlarged sectional view of the bottom portion of the vessel shown in FIG. 1.

Referring to the drawings, FIG. 1 shows an amine removal system generally designated by the reference numeral 2 adapted for line service in a steam distribution system. The apparatus of the present invention is shown as a part of that system and is generally designated by the reference numeral 4. The apparatus includes an elongated vertical vessel 6, preferably of circular cross section. Vessel 6 comprises a cylindrical portion 8, a welding flange 10 mounted to the top of cylinder 8 and a dish 12 mounted to the bottom of cylinder 8. Details of the structure of vessel 6 will be developed hereinbelow. A steam inlet fitting 14 is threadably connected to welding flange 10. An outlet fitting 16 having external threads 17 is welded to the bottom portion of dish 12, as best shown in FIG. 3. By suitable piping, outlet fitting 16 is connected to the inlet 18 of phase separator 20. Outlet 22 of phase separator 20 passes the steam to service. Details of phase separator 20 and its associated equipment will be developed hereinbelow.

Turning now to the details of construction of vessel 6, FIG. 2 shows a diffusor 24 supported by lugs 26 welded to the bottom portion 27 of welding flange 10. Diffusor 24 simply rests on lugs 26 so that it may be easily removed through the enlarged opening 28 in welding flange 10 to provide easy access to the interior of vessel 6. Diffusor 24 is generally cup-shaped and has a flat bottom portion 30. Two rows of spaced openings 32 are located generally in the side wall 34 of diffusor 24, the first row being at the juncture between flat bottom portion 30 and a curved section 35 of wall 34 and the second row being located in the upper portion of wall 34. Post 36 may be connected to the geometric center of diffusor 24 to provide a convenient hand-hold for removal of the diffusor 24 from its mounting within vessel 6.

Turning now to FIG. 3, there is shown a screen assembly generally designated 40 for supporting a bed of granular material 42. Screen assembly 40 includes ring 44 welded to the interior walls of vessel 6, preferably at a point below the juncture between dish 12 and cylinder 8. A perforated metal plate 46 is positioned below ring 44 and welded thereto. Sandwiched between ring 44 and plate 46 is a fine-mesh screen 48, preferably of about 100 mesh or finer. The weldment between plate 46 and ring 44 firmly secures screen 48 in place and eliminates the difficulties associated with welding a fine-mesh screen to another surface. The walls 50 of dish 12 smoothly converge toward outlet 52, thereby forming a collecting chamber 54 beneath the bed of granular material 42.

In the case of amine removal systems, it has been found that bed 42 may advantageously consist of a highly porous acid ion exchange resin generally having a particle size of 50 mesh or less. An example of such a resin is a sulfonated copolymer of styrene and divinylbenzene wherein the divinylbenzene is present at a concentration of 5.5 percent by weight. The functional group of the styrene divinylbenzene copolymer is a $R_xSO_3^-$ (sulfonate) radical. In an amine removal system, resin bed 42 would extend upwardly in vessel 6 to a point below diffusor 24 shown by chain line 56.

In a system for the removal of amines from steam, it has been found desirable to employ a fine-mesh screen 48 having interstices of such size as to permit a cross-sectional area for flow of about 50 percent of the total area of the screen. Likewise, it has been found desirable to use a perforated plate 46 having openings whose total area is about 50 percent of the area of plate 46. These flow characteristics appear to provide optimum dwell time for the steam within vessel 6 in the pressure ranges commonly employed.

The operation of the invention in an amine removal system may be illustrated as follows with appropriate reference to the drawings: Steam, preferably under a pressure of about 80 psig, enters vessel 6 through inlet line 14 and strikes the bottom flat portion 30 of diffusor 24. The steam is dispersed outwardly away from the geometric center of diffusor 24 and passes through openings 32. The dispersed steam passes downwardly through resin bed 42 as indicated by the arrows in FIG. 2. The diffusor 24 acts to effectively create a uniform flow across the entire area of bed 42. As the steam reaches the bottom of the resin bed 42 (see FIG. 3) it passes through screen 48 and through the perforations in plate 46 into collecting chamber 54. The smoothly converging walls 50 of collecting chamber 54 guide the steam through outlet 52, through outlet pipe 16 and into inlet 18 of phase separator 20. A filtering element 58 within phase separator 20 has a hydrophobic coating on its outer surface which permits passage of only the vapor phase (steam) into the interior portion 60 of filter element 58. Any liquid phase present in the steam coalesces on the outer surface of filter element 58 and falls to the bottom of phase separator 20 where it is discharged through trap 62. A pH monitor (not shown) may be applied to the condensate issuing from trap 62 to determine the acidity of the condensate. The decontaminated steam having passed through filter element 58 passes upwardly within the interior portion of 60 within the filter element 58 and through service line 64.

I claim:

1. Apparatus for use in purifying and drying steam comprising:

an upright elongated vessel having a fluid inlet at the top and a fluid outlet at the bottom;

means for introducing high pressure steam into said vessel at said fluid inlet;

a cup-shaped member disposed within said vessel at the upper portion thereof adjacent said fluid inlet and in central alignment therewith, said cup-shaped member having an imperforate flat bottom portion and a plurality of openings radially spaced from the geometric center of said cup-shaped member;

a screen disposed within said vessel at the bottom portion thereof transversely of the direction of fluid flow and having openings no larger than 100 mesh, said screen being adapted to contain a bed of resinous material including sulfonated copolymer of styrene and divinylbenzene within said vessel beneath said cup-shaped member, said resinous material having a particle size not less than 50 mesh;

a perforated plate disposed within said vessel beneath said screen and transversely of the direction of fluid flow, the total area of said perforations being at least equal to the total area of flow passages provided in said screen;

a collecting chamber formed in the bottom portion of said vessel beneath said plate by the walls of said vessel converging toward said fluid outlet; and a filter connected to said fluid outlet of said vessel and including an element having a hydrophobic coating thereon to prevent the passage of liquid and permit only the passage of vaporous steam through said filter.

* * * * *